United States Patent [19]
Enokimoto et al.

[11] 4,407,383
[45] Oct. 4, 1983

[54] MOTOR VEHICLE

[75] Inventors: Akito Enokimoto, Asaka; Toshio Tsuchiya, Kawagoe; Tatsuo Masuda, Niiza; Suwaji Takano, Urawa, all of Japan

[73] Assignee: Honda Giken Kogyo Kabushiki Kaisha, Tokyo, Japan

[21] Appl. No.: 313,361

[22] Filed: Oct. 20, 1981

Related U.S. Application Data

[63] Continuation of Ser. No. 83,627, Oct. 11, 1979, abandoned.

[30] Foreign Application Priority Data

Oct. 13, 1978 [JP] Japan ................................. 53-125947

[51] Int. Cl.³ ............................................... B60R 5/04
[52] U.S. Cl. .............................. 180/54 E; 180/73 TL; 280/781
[58] Field of Search ............... 180/210, 215, 216, 217, 180/21, 54 R, 54 E, 54 F, 55, 56, 62, 63, 297, 299, 75, 73 TL; 280/282, 96.1, 660, 669, 718, 719, 694, 778, 93, DIG. 5, 691, 690, 688, 79.2, 267–269, 781, 786–788, 790

[56] References Cited

U.S. PATENT DOCUMENTS

| 1,164,863 | 12/1915 | Potter et al. ........................ 180/216 |
| 2,521,986 | 9/1950 | Lips ..................................... 280/719 |
| 2,919,758 | 1/1960 | Newton et al. ............... 280/DIG. 5 |
| 3,497,025 | 2/1970 | Rosenkrands ........................ 180/56 |
| 3,580,349 | 5/1971 | Brennan et al. ............. 280/DIG. 5 |
| 3,888,324 | 6/1975 | Kossow ...................... 280/DIG. 5 |

FOREIGN PATENT DOCUMENTS

532921 2/1941 United Kingdom ............... 180/215

Primary Examiner—Joseph F. Peters, Jr.
Assistant Examiner—Ross Weaver
Attorney, Agent, or Firm—Irving M. Weiner; Pamela S. Burt; John L. Shortley

[57] ABSTRACT

A motor vehicle which includes two front wheels and at least one rear wheel. A steering handle is arranged at a widthwise center of the frame of the vehicle, and a driver's seat is arranged substantially at a longitudinal center of the vehicle frame. The floor of the frame upon which the feet of the driver are positioned has substantially the same width as the width of the driver's seat, such that the handling and driving operations of the vehicle can be simplified and improved.

5 Claims, 11 Drawing Figures

MOTOR VEHICLE

This is a continuation of application Ser. No. 83,627 filed Oct. 11, 1979, now abandoned.

BACKGROUND OF THE INVENTION

1. Field of the Invention

The present invention relates to a simplified and small motor vehicle which includes two front wheels and at least one rear wheel.

2. Description of Relevant Art

A motorcycle equipped with a prime mover having a small size and a small displacement is generally well known in the art. The motorcycle of this type includes those which are similar to a bicycle or a scooter. However, a motorcycle of either of such types is provided with only two wheels, and thus cannot be driven by those who are unable to ride a bicycle.

As a light vehicle, on the other hand, a tricycle equipped with a prime mover has found general acceptance. Such a tricycle has a larger size, a more complex construction, and a greater weight than a two-wheeled motorcycle or a scooter, and the displacement or the stroke volume of the prime mover is accordingly increased so that it exceeds the scope of a small and simple vehicle.

There has developed a desideratum for a vehicle having three or four wheels, which can be driven without any difficulty by those who are unable to ride a bicycle, and which satisfies the conditions of small size and weight as well as simplicity. In attempting to provide such a vehocle at a cost comparable to that of a bicycle, however, there arises a number of problems to be solved with respect, for example, to the frame, engine and suspension of the vehicle with a view toward ensuring sufficient riding comfort, maneuverability, drivability and operability.

In the case of a small-size light motor vehicle having two front wheels and one or two rear wheels, it is preferable to obtain the drivability and operability characteristics which are similar to those associated with a bicycle. To this end, the height of the seat of a driver is preferably set such that he can set and place his legs upon steps, while bending his legs substantially at a right angle about his thighs in a manner similar to the position he would assume were he to ride on a bicycle, without being required to stoop down. Thus, it is also preferred that the driver can normally set his feet on the steps and can stretch his legs to the road similar to the case of a bicycle. In this regard, moreover, the legs of the driver have to be protected sufficiently during the running operation of the vehicle. However, if the steps are extended excessively, a driving feeling similar to that of a bicycle decreases, which should be avoided in view of drivability and operability considerations. On the other hand, if the drivability and operability similar to that of a bicycle is considered to be an indispensible condition notwithstanding the fact that the vehicle has three or four wheels, sufficient consideration has to be taken with respect to the steering mechanism.

SUMMARY OF THE INVENTION

The present invention effectively solves the above described problems, and at the same time provides a small, light and simple motor vehicle having three or four wheels and excellent drivability and operability characteristics which are similar to those of a two-wheeled scooter.

It is an object of the present invention to provide a motor vehicle having two front wheels, in which a steering shaft is arranged at a widthwise center of the vehicle frame, in which the driver's seat is arranged substantially at a longitudinal center of the vehicle frame, and in which the floor of the frame to be interposed between the steering shaft and the seat for permitting the driver's feet to be set thereon is made to have substantially the same width as that of the seat.

According to the present invention, the driver of the motor vehicle can move his legs without any interference with the front and rear wheels and the covers therefor to such an extent that his feet can be brought away from the floor and set on the ground when the vehicle is halted, thus enjoying the advantage of improved handling, drivability and operability.

A further advantage according to the present invention resides in the fact that the driver can drive with his feet set on the floor, while being seated upon the seat which is positioned somewhat high. Thus, the driver can set his feet, while properly arranging his knees, between the covers of the front and rear wheels, to thereby safely protect his legs.

Moreover, because the foot floor according to the present invention has substantially the same width as that of the driver's seat and because the seat itself is arranged substantially at a longitudinal center of the vehicle body, the vehicle itself can be easily handled and moved while the engine is stopped or idled, similarly to the case of a bicycle, with the resultant advantage of excellent handling and operability.

Another object of the invention is to provide a motor vehicle having two front wheels, in which the front wheels are supported at both ends of two leaf springs which extend in a widthwise direction and are arranged in vertically-spaced relation, while holding the front portion of the vehicle frame therebetween. The motor vehicle further includes two rear wheels and two leaf springs which are provided to extend rearwardly from the vehicle frame below the seat such that the proximal ends thereof are connected to the vehicle frame at both sides of the seat, and the free distal ends thereof support the axles of the rear wheels, Further, a power unit including an engine is interposed between the rearwardly extending leaf springs.

Other objects and advantages of the present invention will become apparent from the following detailed description when read in conjunction with the accompanying drawings.

DETAILED DESCRIPTION OF PREFERRED EMBODIMENTS

Figure 1:
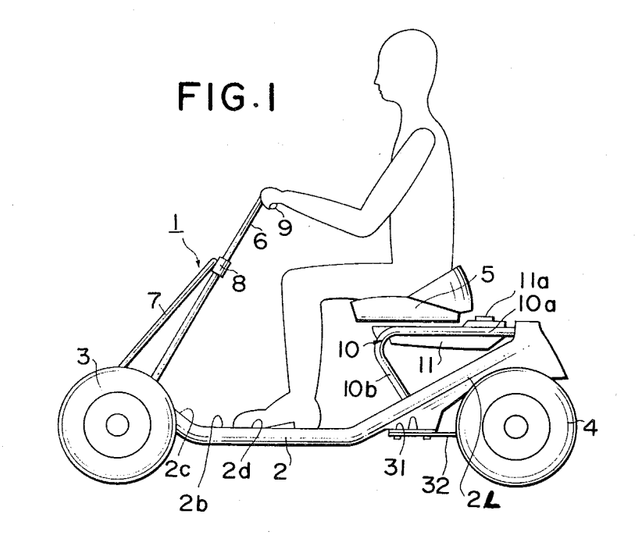
FIG. 1 is a side elevational view diagrammatically illustrating a vehicle according to the present invention.
Figure 2:
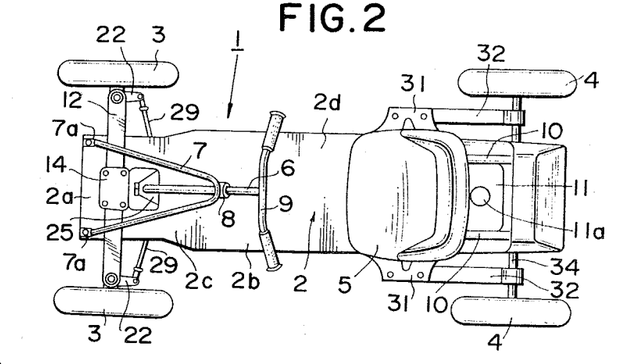
FIG. 2 is a top plan view of the vehicle of FIG. 1.

FIGS. 1 and 2 comprise, respectively, a side elevational and a top plan view showing the basic construction of a vehicle according to the present invention.

The general layout of a vehicle 1 according to the present invention will be diagrammatically described hereinbelow.

A frame 2 extends longitudinally of vehicle 1, and is equipped at the front sides thereof with a pair of front wheels 3, 3 acting as steering wheels, and at the rear sides thereof with a pair of rear wheels 4, 4 acting as drive wheels. In other words, the vehicle according to the present embodiment of the invention is a four-wheel vehicle having two front and two rear wheels. The frame 2 is further equipped at its center or rear portion, i.e., at a substantially central portion in the longitudinal direction, with a saddle seat 5 which provides a seat for a driver. Thus, with the driver seated on saddle seat 5 with his legs bent substantially at right angles about his thighs and his knees comfortably arranged, while his hands are gripping the respective ends of transversely extending handlebar 9, (FIG. 1), the center of gravity of the vehicle is defined substantially at the longitudinal center thereof to provide favorable driving characteristics during vehicle operation. The frame 2 is made to have a substantially equal width to that of seat 5. At a front portion and a widthwise (or transverse) central portion of frame 2, there is disposed a steering shaft 6 which is made to extend rearwardly at an inclination. The shaft 6 is mounted on the upper end of an inverted V-shaped stay 7, which in turn has its lower ends 7a, 7a fixed to both sides of the frame front end, and is rotatably fitted in a supporting member 8. To the upper end of shaft 6 is fixed a steering bar 9 which constitutes the handle of the vehicle for performing the steering operations. The frame 2 is formed at its intermediate portion between steering shaft 6 and seat 5 with a floor 2d which has a substantially constant width along the longitudinal direction thereof which is substantially the same as the width of seat 5 so as to provide a resting place for the feet of the driver, the floor 2d having a width which is less than the length of handlebar 9 such that the end grips of handlebar 9 extend beyond the width of floor 2d. As shown in FIG. 1, the floor 2d is substantially open at both sides thereof and extends substantially horizontally at a level substantially lower than the level of the uppermost portions of wheels 3, 4. Further, saddle seat 5 is spaced substantially upwardly from the level of the uppermost portions of wheels 3, 4.

Figure 3:
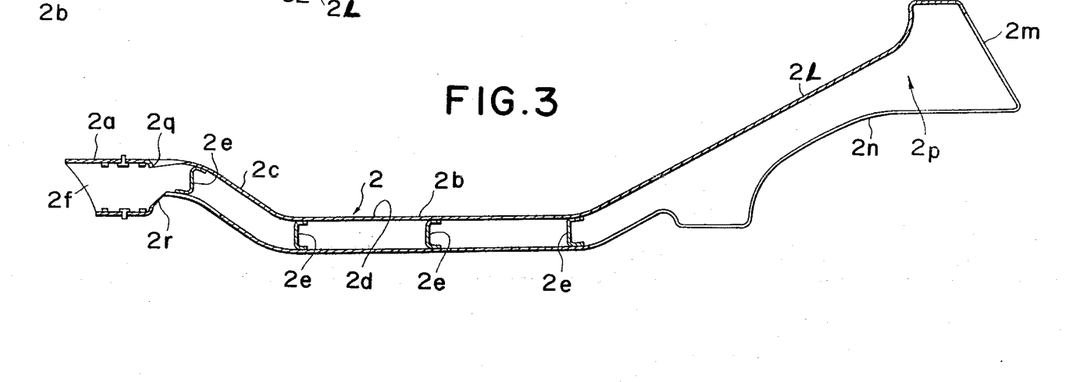
FIG. 3 is an enlarged longitudinal section depicting the frame of the vehicle.
Figure 6:
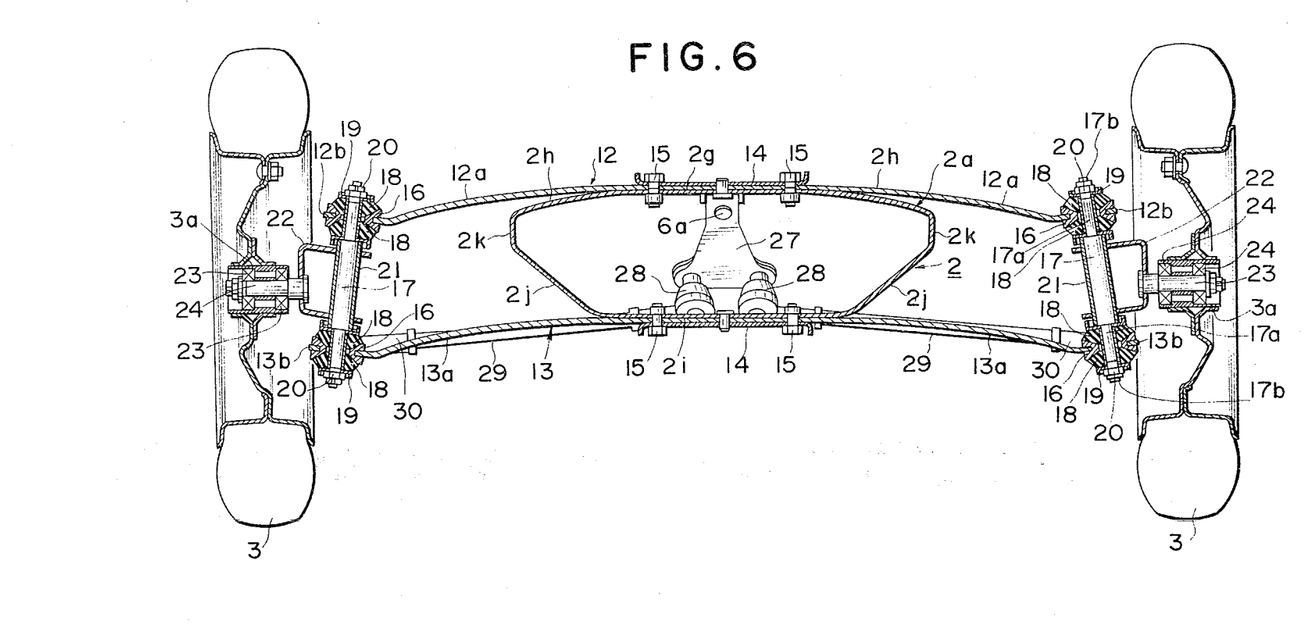
FIG. 6 is an enlarged transverse section showing the front suspension of the vehicle.

The overall construction of frame 2 may be clearly seen with reference to FIGS. 3 and 6. The frame 2 is made for a steel plate which is press-molded into a shape having a box cross-section, as shown in FIG. 6, and is comprised of a horizontal front portion 2a, a horizontal intermediate portion 2b, and a sloped connecting portion 2c extending therebetween. A plurality of cross members 2e are mounted in frame 2 at longitudinally spaced intervals, to thereby improve the rigidity and strength of frame 2. Further, frame 2 has its front end opened at 2f.

The front portion 2a of frame 2 is formed one step higher, as apparent from FIG. 3, then the intermediate portion 2b. The cross-sectional shape of the front portion 2a (FIG. 6) is such that an upper portion 2g thereof has its upper side portions 2h, 2h slightly curved downwardly, with the center portion being the highest, and flat. The front portion 2a has a flat lower portion 2i positioned at the lowest level thereof and has both lower side portions 2j, 2j thereof inclined upwardly such that inclined portions 2j, 2j are merged into the warped portions 2h, 2h at side walls 2k, 2k.

Figure 8:
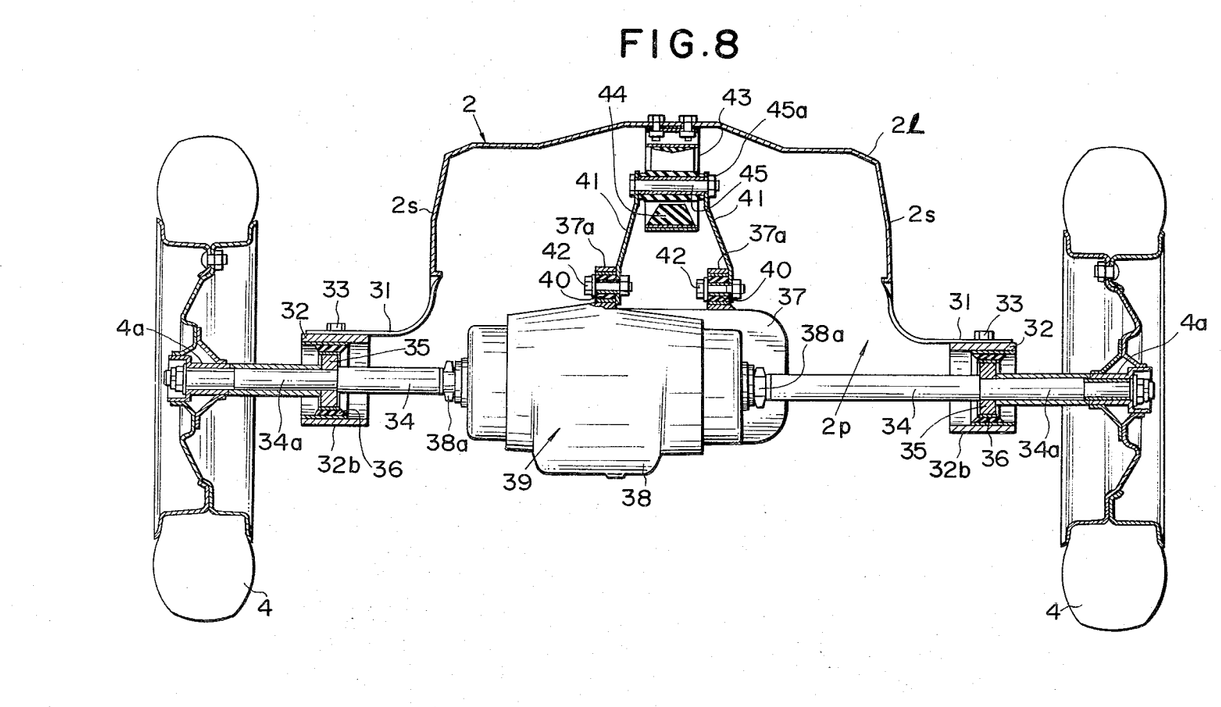
FIG. 8 is a section taken along line 8—8 of FIG. 7.

The rear portion 2L of frame 2 has its rear portion extending from the rear end of the intermediate portion 2b backwardly and upwardly at an inclination. The rear portion 2L has the lower and rear ends thereof opened at 2m and 2n. As a result, the rear portion 2L is opened downwardly to form a space 2p therein, as shown in FIG. 8.

Arranged at both sides of the sloped rear portion 2L of frame 2 is a pair of generally L-shaped stays 10, 10 (FIG. 7), each of which has the horizontal portion 10a thereof connected at its rear end to the upper portion of rear portion 2L, and the bent depending portion 10b of each stay 10 is connected to the sloped portion of rear portion 2L. The seat 5 is carried on stays 10, 10 in a transverse manner. A fuel tank 11 is mounted between the stays 10, 10 and below seat 5. The fuel tank 11 has the cap 11a thereof disposed at the back of seat 5 and threadedly fastened on the inlet of tank 11.

Figure 4:
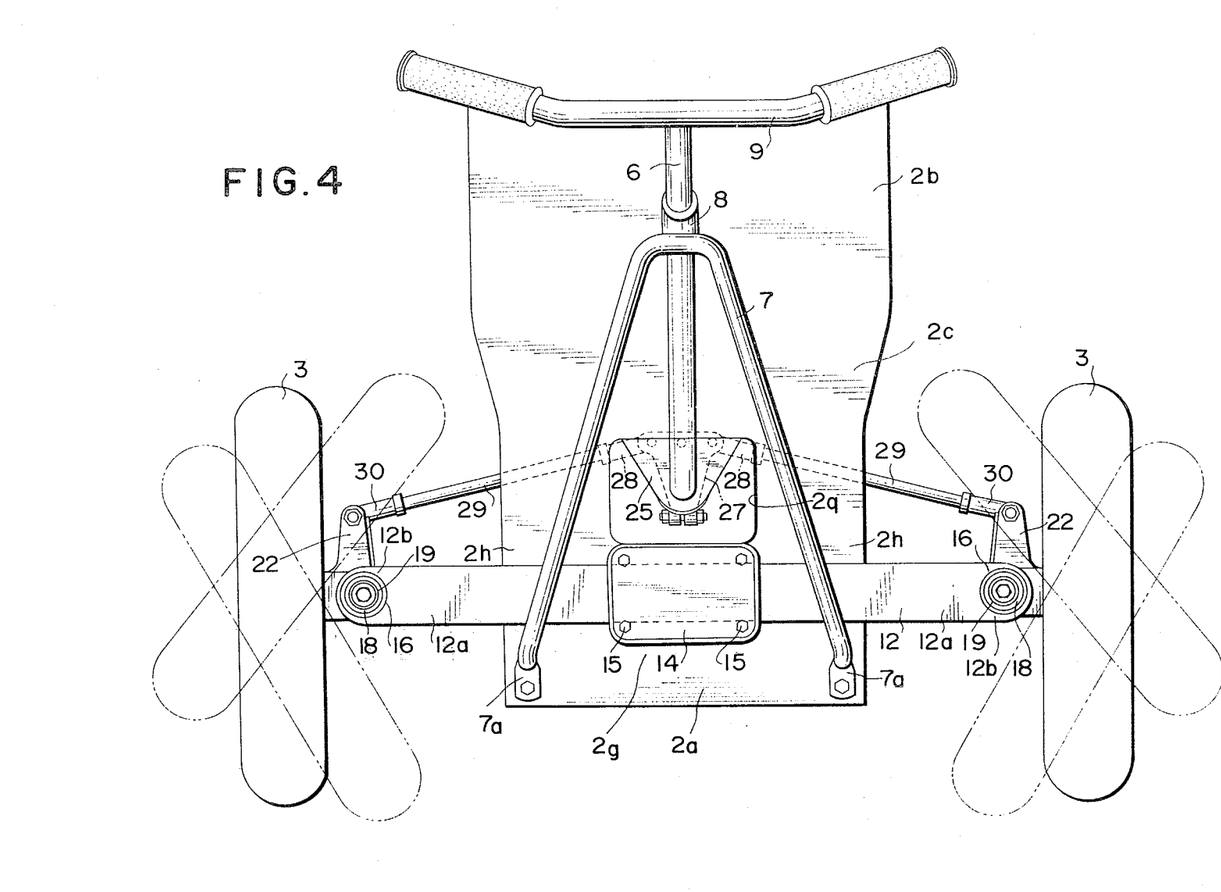
FIG. 4 is an enlarged top plan view illustrating a front portion of the vehicle.

As clearly shown in FIGS. 4 and 6, a widthwise extending leaf spring 12 is mounted on the front portion 2a of frame 2 between the lower ends of steering shaft 6 and stay 7. Another leaf spring 13 is mounted on the lower side of front portion 2a in parallel with spring 12. Thus, the upper and lower parallel leaf springs 12 and 13 are arranged in a vertical spaced relation, with front portion 2a of frame 2 sandwiched therebetween. Leaf springs 12 and 13 have their longitudinal end portions 12a and 13a extending from the right and left sides of frame 2. The leaf springs 12 and 13 are connected to the outsides of the upper and lower portions 2g and 2i of front portion 2a, i.e., the spring 12 to the upper side and the spring 13 to the lower side, through holder plates 14, 14 by means of bolts and nuts 15.

The leaf springs 12 and 13 have both end portions 12a and 13a thereof equipped with mount portions 12b and 13b which are spaced vertically and on which collars 16 and 16 are fitted. A king pin 17 is inserted into the upper and lower collars 16 and 16. Between the upper and lower end portions 17a, 17a of pin 17 and the upper and lower sides of the collars 16 are mounted a pair of bush-shaped rubber mounts 18, 18 which have both axial ends thereof formed into a frustoconical shape. A washer 19 is attached to the outer end face of rubber mounts 18, and a nut 20 is mounted on the axially upper and lower end portions of pin 17 and is fastened to the threaded portions 17b, 17b. As a result, the rubbers 18 and 18 are compressed in the axial direction of kind pins 17 so that pins 17 are connected to both mount portions 12b and 13b of the upper and lower leaf springs 12 and 13.

Mounted on each of the king pins 17 is a bush 21 which is connected to a knuckle 22. To knuckle 22 is fixed a front axle 23 which in turn supports the hub 3a of each of the front wheels 3, 3 through a bearing 24.

As described hereinabove, the front wheels 3, 3 are mounted sideways of the frame front portion 2a, i.e., in a manner protruding transversely from respective opposite sides of floor 2d, and are supported on both end portions of the upper and lower leaf springs 12 and 13 through the elastic members 18, 18. The leaf springs 12 and 13 act as suspension members for the right and left front wheels 3, 3 and provide an elastic warping action to act as a shock absorber. For the reactions to be imparted from the road to the front wheels 3, 3, therefore, both of the end portions 12a and 13a of the upper and lower leaf springs 12 and 13 extending sideways from frame 2 can elastically move up and down in parallel with each other to thereby perform the shock absorbing actions in response to the motions of wheels 3, 3. The substantial upward warp of the ends of lower leaf spring 13 is regulated by the sloped portions 2j, whereas the downward warp of the ends of the upper leaf spring 12 is regulated by the curved portions 2h. More specifically, the warping motions resulting from the vertical shock absorbing actions of the leaf springs 12 and 13 are regulated by both sides of the front portion 2a of frame 2 so that excessive deformation of leaf springs 12 and 13 is prevented, because both side portions 2h and 2j act as stoppers.

Because the king pins 17 are connected to the leaf springs 12 and 13 through the elastic members 18, the fine vibrations of the front wheels resulting from the roughness of the road can be effectively absorbed and attenuated by the actions of the elastic members 18, whereby the transmission of vibrations to frame 2 can be restricted and reduced to improve riding quality. In this regard, elastic members 18 are paired at the ends of king pins 17 and are axially forced, while interposing the collars 16 therebetween, by fastening the nuts 20. As a result, the elasticity of elastic members 18 can be varied by adjusting the fastening forces of nuts 20 so that the preferred attenuation can be easily preset merely by adjusting the fastening forces.

A predetermined camber of front wheels 3, 3 is maintained because the king pins 17 are supported at their upper and lower ends. More specifically, the camber is returned to its normal angle, even if it changes, by the actions of the elastic members 18. The change in the camber is also absorbed through the deformation of elastic members 18 so that the camber can be maintained at a normal level.

Figure 5:
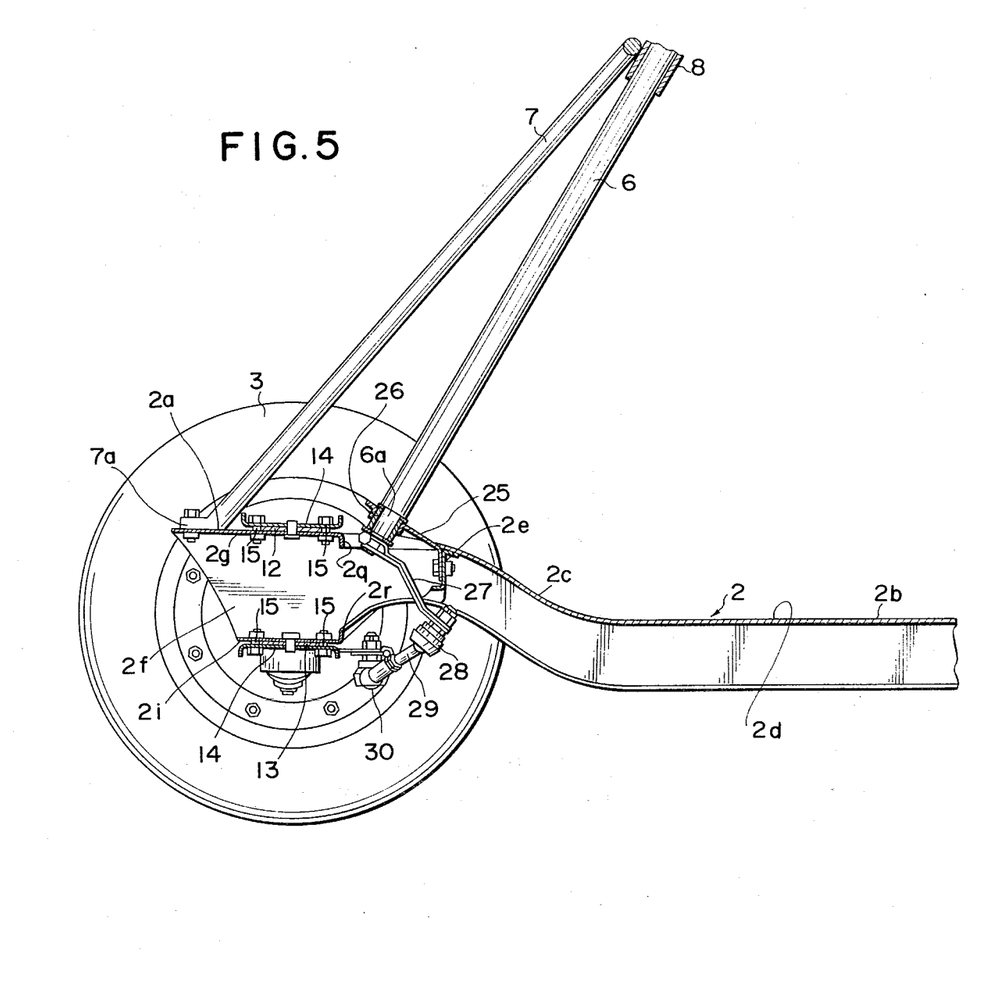
FIG. 5 is an enlarged longitudinal section of a portion of FIG. 4.

The upper and lower portions 2g and 2i of the frame front portion 2a are formed with through-openings 2q and 2r at the back of leaf springs 12 and 13. As shown in FIGS. 4 and 5, a bracket 25 extending forwardly and upwardly at an inclination is mounted to the cross member 2e facing opening 2q. Bracket 25 supports the lower end 6a of steering shaft 6 in a rotatable manner through a collar 26. To the lower extension of shaft lower end 6a there is connected an arm 27 which extends through the frame front portion 2a such that its lower end portion protrudes from the lower opening 2r. A pair of tie rods 29, 29 are connected at first ends thereof to the lower end portions of arms 27 through joints 28. The second ends of tie rods 29 are connected to knuckles 22 through joints 30, 30. The two joints 28 and 30 function as universal joints, allowing the tie rods 29, 29 to follow the vertical movements of knuckles 22, which in turn follow the motions of the end portions of leaf springs 12 and 13 resulting from the motions of the front wheels 3, 3. The arms 27 are almost housed in the front portion 2a of frame 2, whereas the tie rods 29 and the joints 30 are disposed at the back of leaf spring 13. As a result, the steering mechanism thus described has the front portion thereof protected because the leaf springs and other members are arranged in front of same.

The suspension system of the front wheels can also be applied to a vehicle having a single rear wheel.

The arrangement of the suspension system for the rear wheels and the engine of vehicle 1 according to the present invention will be described in the following. As apparent from the drawings, in the present embodiment of the invention the vehicle is equipped with four wheels, i.e., two front wheels and two rear wheels.

Figure 7:
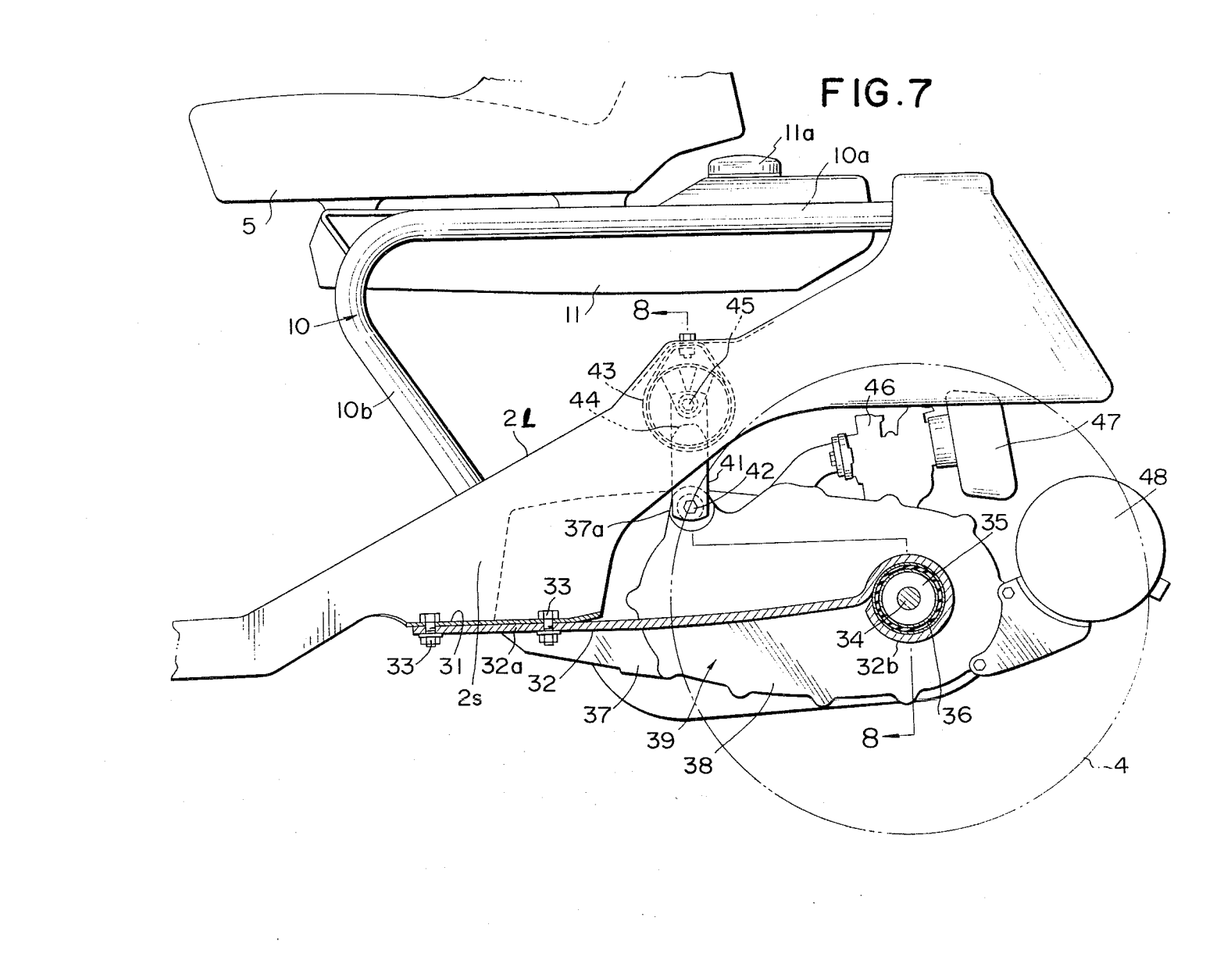
FIG. 7 is an enlarged side elevation of a rear portion of the vehicle, and showing an essential portion thereof in section.

With reference to FIGS. 7 and 8, a pair of flanges or mount portions 31, 31 are formed at the lower portion of the rear portion 2L of frame 2 and at the lower ends of both side walls 2s and 2s thereof below seat 5. The flanges 31, 31 are press-molded integrally with the frame 2 such that they extend horizontally outwardly from the lower ends of walls 2s, 2s, on both sides of seat 5. A pair of leaf springs 32, 32 are connected at their base or proximal ends 32a, 32a to flanges 31, 31 by means of bolts and nuts 33.

The leaf springs 32, 32 comprise very narrow plates which extend rearwardly while having their proximal ends 32a connected to both lower sides of seat 5 at frame 2 through flanges 31, as set forth hereinabove. These right and left leaf springs 32, 32 are spaced in the widthwise direction of frame 2 and are extended rearwardly in parallel and have a length just short of reaching the rear end of frame 2. Each of the leaf springs 32 has its rear end formed into a free end, which is wound into a loop shape to form a rear axle bearing portion 32b. Thus, the transverse extension of leaf springs 32, 32 can be restricted to such an extent as to slightly protrude from both sides of frame 2.

A rear axle 34 acting as a drive shaft is mounted transversely between the bearing portions 32b, 32b of leaf springs 32. The rear axle 34 has both end portions 34a, 34a thereof extended through the bearing portions 32b, 32b such that they protrude to the outside thereof so as to carry the hubs 4a of the rear wheels 4, 4. More specifically, the extending ends of leaf springs 32, 32 support the rear wheels so that the leaf springs 32, 32 constitute the suspension members for the rear wheels 4, 4. As a result, the leaf springs 32 have their proximal ends 32a connected to frame 2 and their rear axle bearing ends 32b formed into free ends so that wheels 4, 4 can elastically move up and down. Thus, the leaf springs 32 provide a suspension system which is similar to a trailing arm and which resembles an independent suspension.

In addition, the support of rear axle 34 by the bearing portions 32b of leaf springs 32 is carried out by mounting a bush-shaped rubber mount 36 between the inner periphery of each of the bearing portions 32b and the outer circumference of a bearing bush 35 which is fitted on the corresponding circumferential portion of rear axle 34. As a result, the right and left rear wheels 4, 4 are elastically suspended by leaf springs 32 relative to the vehicle body and by the rubber mounts 36 relative to leaf springs 32 themselves. Thus, the shock absorbing effects upon the rear wheels can be enhanced, and the compliance of the right and left rear wheels during the cornering operation can be effectively improved by the action of the rubber mounts 36. Because leaf springs 32, 32 act as cantilever supports for the rear wheels 4, 4. In addition to the effects of the aforesaid trailing arm, it is possible to make the length of the leaf springs 32 as short as possible while extending rearwardly and to have a large swinging stroke in the vertical direction while the leaf springs 32 themselves are shortened. As a result, the wheel base of the vehicle can be accordingly shortened in relation to the front wheels 3.

Figure 9:
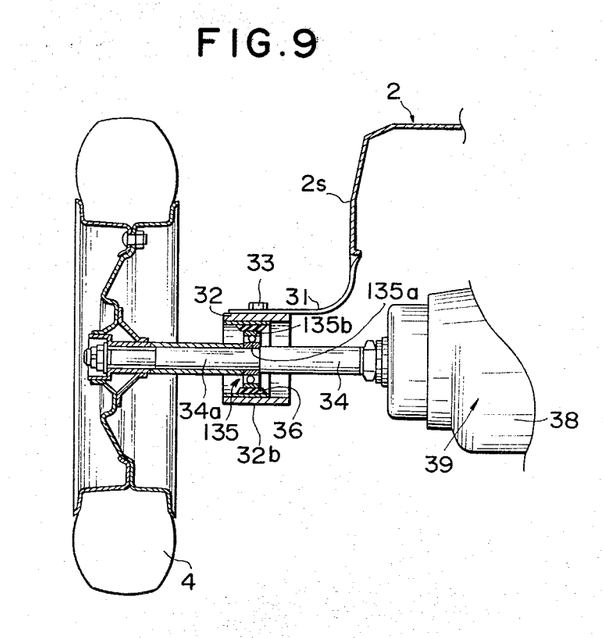
FIG. 9 is a view similar to FIG. 8, but showing a modification of the rear axle supporting portion of FIG. 8.

As shown in FIG. 9, the support of axles 34 by the bearing portions 32b, 32b is carried out by mounting a ball bearing 135 upon the outer circumference of each of the axles 34 to support the axle at the inner race 135a thereof and by jointing the outer race 135b to the inner circumference of a rubber mount 36. As a result, the rotations of the axles can be further smoothened.

The engine of the vehicle has a power unit 39 which is formed integrally of an engine body 37 and a transmission case 38. The engine unit 39 is arranged, as shown in FIG. 8, between the right and left leaf springs 32, 32 below the rear portion 2L of frame 2 and in a position to face the space 2p opened at 2m and 2n. Above the engine 37, there is arranged a pair of brackets 37a, 37a which are spaced from each other in the widthwise direction and which are connected to and supported by a pair of suspension plates 41, 41 through rubber mounts 40 by means of bolts and nuts 42.

From the lower side of rear portion 2L of frame 2 there depends a bracket 43, to the center of which a mount pin 45 is transversely mounted through a rubber mount 44. The pin 45 has both ends thereof connected to the upper ends of the suspension plates 41, 41. In the embodiment shown, the pin 45 comprises a bolt, to which a nut 45a is fastened to connect the plates 41, 41.

With reference to FIG. 7, there is also shown a carburetor 46, an air cleaner case 47, and a muffler 48.

As described hereinabove, the engine unit 39 is mounted in the downwardly opened space 2p of rear portion 2L of frame 2 and is suspended by the rubber mounts from frame 2. Because the rubber mounts are disposed at the three points, i.e., at the two points at which mounts 40, 40 are disposed at the side of engine unit 39 and at the point at which means 44 is disposed at the side of frame 2, the engine unit 39 can smoothly follow the longitudinal, transverse, and vertical motions of the rear wheels 4, 4 so as to elastically support and protect the engine.

The vibrations of rear wheels 4, 4 and the engine 37 can be effectively attenuated through the aforementioned rubber mounts, which ensures excellent vibration-preventing effects.

In addition, the mounting portion of engine unit 39 is disposed at a widthwise center between rear wheels 4, 4, and engine body 37 which has the center of gravity of unit 39 is disposed at a substantial center in the longitudinal direction of leaf springs 32, as shown in FIGS. 7 and 8. As a result, a heavy power unit can be effectively mounted while improving space utility and ensuring a preferred layout with respect to rigidity. Because the unit 39 is arranged at the center between rear wheels 4, 4, the transverse balance at the back of the vehicle can be improved to a satisfactory level, even for inertia occurring during the cornering operation.

Moreover, the engine unit 39 is connected to the rear axles 34. More specifically, the rear axle 34 is axially divided, as shown in FIG. 8, into two halves 34, 34, which have the inner ends thereof connected in alignment to the output shaft portions 38a, 38a extending from both sides of transmission case 38 at the back of unit 39 so as to constitute a power unit integrated with the rear axles. Thus, the unit 39 is arranged on the axis of rear axles 34, 34 at the vertical and transverse center of the space between the rear wheels. As a result, the engine unit 39 is disposed at a low position in the vehicle, to thereby lower the center of gravity of the vehicle, and to eliminate the drawback caused by inertia during the cornering operation when the driver is taking the seat 5, thus remarkably improving stability of the vehicle. Moreover, because the unit is connected in alignment to the rear axles, space utility is advantageous, and the construction can be so remarkably simplified as to eliminate the need for a complicated transmission drive system.

As described hereinabove, the power unit 39 is arranged in the downwardly opened space 2p of frame rear portion 2L to thereby improve space utility and stability, and to simplify the transmission drive system so that the engine mount can be effectively accomplished with the use of a minimum number of parts.

In the shown embodiment, because the rear portion 2L is opened at its lower side and is inclined, the air flow, having passed below the intermediate portion 2b of frame 2, is guided by the slope of rear portion 2L to pass around the engine 37 so that the engine 37 is forcibly and efficiently cooled down.

Figure 10:
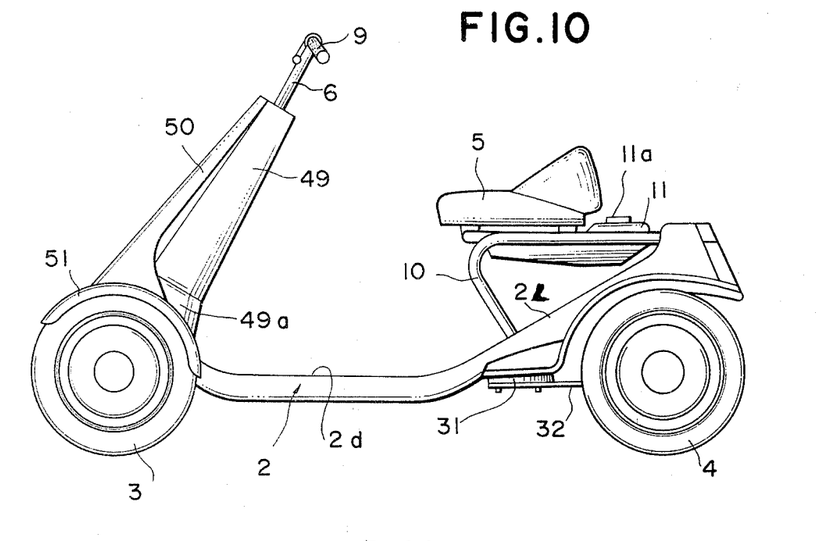
FIG. 10 is a side elevation illustrating the general appearance of the vehicle.
Figure 11:
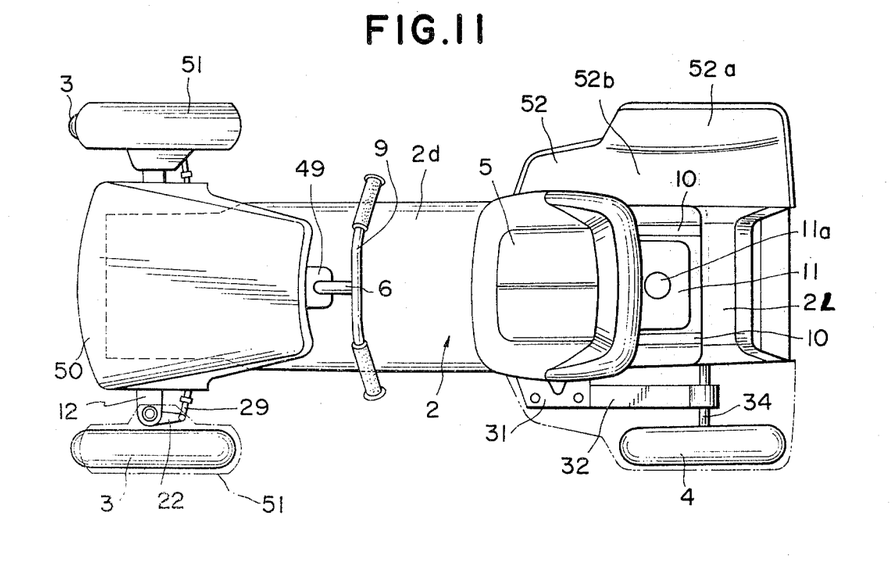
FIG. 11 is a top plan view of the vehicle shown in FIG. 10.

FIGS. 10 and 11 show one example of the overall appearance of the vehicle in accordance with the present invention. As shown, mounted around steering shaft 6 is a cover-shaped column 49, the lower portion 49a of which shields the opening 2q of frame front portion 2a and the leaf spring holder plate 14. The front portion 2a of frame 2 is also covered with a front cover 50 extending from the upper end of column 49 to the forwardmost opening 2f. The right and left front wheels 3, 3 are protected by fenders 51, 51. Fenders 51, 51 may be formed integrally at both lower portions of cover 50.

As shown in FIG. 11, the frame rear portion 2L is covered with a rear cover 52, which includes fender portions 52a for rear wheels 4, 4 and portions 52b extending above leaf springs 32 to thereby improve the appearance as well as to protect such portions. More specifically, the cover 52 is extended from the rear portion 2L below seat 5 in the rearward direction to cover not only leaf springs 32, 32 but also rear wheels 4, 4. Alternatively, cover 52 may be formed of separate halves attached to the frame 2, or an integral one attached thereto.

In the construction as described hereinabove, the foot floor 2d of frame 2 is made to have substantially the same width as seat 5 so that the feet of the driver can be naturally positioned upon floor 2d when he is seated upon seat 5. Moreover, the floor 2d is substantially narrower than the spacing between the front and rear wheels 3, 3 and 4, 4 and is interposed therebetween. Although the wheels 3 and 4 are shielded with covers 51 and 52, respectively, the foot floor 2d has both sides thereof opened. As a result, the driver, even while seated on saddle seat 5, can extend his feet from the low floor 2d, when the vehicle is stopped, to step upon the ground, even though the vehicle has four or three wheels. Thus, the driver can enjoy a high degree of freedom in moving his feet and can, while seated, push or kick his feet against the ground on both sides of the vehicle so as to easily move the vehicle. Moreover, the feet are protected at the front and back with the wheel fenders and are supported upon the floor. It is thus possible to facilitate handling, operating and driving of the vehicle while ensuring protection and support of the feet. Especially when the vehicle is manually moved and pushed with its handle grasped by hands, while the engine is stopped or idled, it can be easily moved by the operator who is positioned at the side of floor 2d, because floor 2d is disposed inwardly from the front and rear wheels. As a result, the vehicle can be handled and operated satisfactorily when it is desired to park or stop.

It is to be understood that the shape and construction of the covers, etc., as described hereinabove, is merely exemplary, and it is contemplated that other embodiments thereof may be readily employed within the context of the present invention.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A single-seated motor vehicle having two front wheels and at least one rear wheel, said at least one rear wheel being driven by a power unit, wherein the driver can comfortably place at least either foot on a ground surface while in a seated position, comprising:
   a saddle seat for a driver of said vehicle, said seat being spaced upwardly from the level of the uppermost portions of said wheels and disposed substantially at a longitudinal center of a frame of said vehicle;
   a steering shaft disposed substantially at a widthwise center of said vehicle frame;
   said frame including a floor which is interposed between said steering shaft and said seat and which extends substantially horizontally at a level substantially lower than said level of the uppermost portions of said wheels;
   said floor having a substantially constant width along the longitudinal direction thereof which is substantially the same as the width of said seat, and being substantially open at both sides thereof;
   said front wheels being arranged in a manner protruding transversely from respectively opposite sides of said floor;
   said floor having said substantially constant width defining an open space extending rearwardly of said protruding front wheels and along each side of said floor so as to permit a seated drive of said vehicle to comfortably place each foot on a ground surface at the respective sides of said floor; and
   a handlebar fixed to said steering shaft, said handlebar having a length longer than the width of said floor.

2. A motor vehicle according to claim 1, wherein:
   said vehicle includes two rear wheels; and
   said power unit is disposed between said saddle seat and said rear wheels.

3. A motor vehicle according to claim 1 or 2, wherein:
   said two front wheels are supported at both ends of two leaf springs which extend in the widthwise direction of said vehicle; and
   said two leaf springs are arranged so as to be vertically spaced apart while holding the front portion of said vehicle frame therebetween, to thereby constitute the suspension mechanism of said two front wheels.

4. A motor vehicle according to claim 2, wherein:
   two leaf springs are provided to extend rearwardly from said vehicle frame below said seat such that the proximal ends thereof are connected to said vehicle frame at both sides of said seat and the free distal ends thereof support the axles of said two rear wheels;
   said two front wheels are supported at both ends of two leaf springs which extend in the widthwise direction of said vehicle; and
   said two leaf springs are arranged so as to be vertically spaced apart while holding the front portion of said vehicle frame therebetween, to thereby constitute the suspension mechanism of said two front wheels.

5. A motor vehicle according to claim 1 or 2, wherein:
   said front and rear wheels are covered with respective covers.

* * * * *